United States Patent
Rosenberg et al.

(10) Patent No.: US 7,046,186 B2
(45) Date of Patent: May 16, 2006

(54) FRIEND/FOE IDENTIFICATION SYSTEM FOR A BATTLEFIELD

(75) Inventors: Avner Rosenberg, Beit Shearim (IL); Alon Deutsch, Kiryat Motzkin (IL)

(73) Assignee: Rafael-Armament Development Authority, Ltd., Haifa (IL)

( * ) Notice: Subject to any disclaimer, the term of this patent is extended or adjusted under 35 U.S.C. 154(b) by 0 days.

(21) Appl. No.: 10/796,855

(22) Filed: Mar. 9, 2004

(65) Prior Publication Data
US 2005/0128131 A1  Jun. 16, 2005

(30) Foreign Application Priority Data
Mar. 10, 2003  (IL) ..................................... 154835

(51) Int. Cl.
G01S 13/79 (2006.01)
G01S 13/75 (2006.01)
G01S 13/78 (2006.01)

(52) U.S. Cl. ............................ 342/45; 342/42; 342/51; 342/118; 342/146; 342/147; 342/175; 342/195; 342/21

(58) Field of Classification Search ................. 342/21, 342/29–40, 42–51, 175, 195, 118–158, 13–20; 340/500, 501, 10.1, 10.6; 375/130–153
See application file for complete search history.

(56) References Cited

U.S. PATENT DOCUMENTS

| | | | | |
|---|---|---|---|---|
| 4,862,176 A | * | 8/1989 | Voles | 342/45 |
| 4,910,521 A | * | 3/1990 | Mellon | 342/45 |
| 5,144,315 A | * | 9/1992 | Schwab et al. | 342/49 |

(Continued)

FOREIGN PATENT DOCUMENTS

EP    0520666 A1  * 12/1992

(Continued)

*Primary Examiner*—Bernarr E. Gregory
(74) *Attorney, Agent, or Firm*—Akin Gump Strauss Hauer & Feld, LLP

(57) ABSTRACT

The invention relates to an IFF apparatus for ground applications, which comprises: (a) an encoder for forming an interrogating or response sequence of pulses, and conveying the same to a UWB transmitter; (b) an UWB transmitter for getting said interrogating or response sequence of pulses, forming a corresponding interrogating or response signal of a sequence of UWB pulses, and transmitting the same via a UWB transmitting antenna; (c) a plurality of UWB receiving antennas, disposed away one from the other, for receiving either an interrogating signal or a response signal sent by another IFF apparatus; (d) a decoder for getting from at least one of said UWB receiving antennas received signals, decoding the same, comparing the decoded signal with a bank of pre-stored signals, and determining whether a received signal is an interrogating or response signal; and (e) a processing unit for, upon receipt of a signal of response to an interrogation signal sent by the present IFF apparatus, calculating the location of the responding IFF apparatus by: (I) determining the range R by the time delays between the interrogating and response signals; (II) determining the direction vector to the responding IFF apparatus by evaluating the time differences between arrival of each response pulse to a plurality of receiving antennas; and (III) determining the identity of the responding IFF apparatus by checking the received sequence of UWB pulses, assuming that the sequence of each IFF apparatus is unique.

18 Claims, 10 Drawing Sheets

U.S. PATENT DOCUMENTS 5,239,309 A * 8/1993 Tang et al. .................... 342/13
5,262,784 A * 11/1993 Drobnicki et al. ............ 342/45
5,299,227 A * 3/1994 Rose ........................... 342/45
5,748,891 A 5/1998 Fleming et al.
5,796,362 A * 8/1998 Ayasli et al. .................. 342/45
6,002,708 A 12/1999 Fleming et al.
6,393,045 B1 * 5/2002 Belcher et al. ............. 375/130
6,420,995 B1 * 7/2002 Richmond et al. ............ 342/45
6,784,827 B1 * 8/2004 Hirt ............................. 342/42
6,812,884 B1 * 11/2004 Richley et al. ............... 342/46

FOREIGN PATENT DOCUMENTS

EP 1189073 A2 * 3/2002

* cited by examiner

FRIEND/FOE IDENTIFICATION SYSTEM FOR A BATTLEFIELD

FIELD OF THE INVENTION

The invention relates to a system for distinguishing between friends and foes in a battlefield. The system of the invention can be used for locating friends in a battlefield, and is mostly for identifying between friends and foes in an on-ground battlefield.

BACKGROUND OF THE INVENTION

The need for distinguishing between friend and foe on a battlefield is of the utmost importance. The identification of forces is critical during operations of armed forces, but it also has civilian aspects, for example, when it is needed to identify and locate travelers under conditions of difficult terrain.

The present invention provides a system and method for locating and identifying forces on a battlefield. Although the system and method is applicable in identifying ground mobile forces, airplanes, or navy vehicles, its most advantageous property lies in the locating and identifying of ground forces, vehicular or infantry forces, particularly when operating in rough terrain and difficult visibility. The following explanation will therefore relate particularly to the aspect of locating and identifying on ground forces, infantry and/or vehicular, in a battlefield. However, it should be kept in mind that the invention is not limited to such an application.

The problem of locating and identifying friendly forces during operations of armed forces is complicated and well known for many years. There are many cases in which friendly forces were identified as foes (or vice versa), resulting in serious losses. Over the years, significant efforts have been made in order to solve this problem. Satisfactory solutions have been provided, particularly in the aerial battlefield. The main solutions that have been applied for aerial IFF are:

1. IFF Interrogation Use of predefined narrow band signals in predefined frequencies for transmission and receiving of IFF signals. A coded interrogation signal is sent to the interrogated object on a first frequency (e.g. 1030 MHz), and the interrogated object responds in another coded signal on a second frequency (e.g., 1090 MHz). The 1030 MHz and 1090 MHz are standard frequencies which have been assigned for civilian and military IFF applications.
2. Radar Interrogation: A tracking radar system sends a signal to a target which responds (or upon request) by transmitting a coded signal in the frequency of the radar (or another frequency), allowing the radar to identify whether the object is a friend or foe. As the radar has a narrow beam, in air applications in most cases only one airplane is found to be within the transmitted beam.

In aerial applications, the density of the objects is low, the ranges are long, and there are no terrain disturbances. Therefore, the existing aerial systems are relatively satisfactory, and operate comparatively well. More specifically, a radar beam preferably "illuminates" one flying object at a time, so that its IFF response can be linked to a specific space location.

The situation on the ground battlefield is much more complicated. The terrain is generally not covered by radar systems, as the terrain conditions do not allow it. In contrast to the aerial situation, in which the airplanes are essentially exposed to radar systems, the operation of ground forces is particularly based on concealed movement, finding firing positions, and identifying targets in the area. Identification mistakes, or navigation errors frequently result in firing on friendly forces. In infantry forces the problem is particularly acute, as these forces frequently move through rough terrain, and/or under difficult visual conditions.

The most important requirement from an IFF system is to provide to the interrogator the location of all the friend forces which are within a firing range, with a very high level of certainty, and not to falsely identify any of the friends as foe, whether the reason for the false identification is resulted from accidental cause or intentional cause. Further important characteristics of a ground IFF system are:

Covertness: The covertness is of particular importance in ground forces, for their survival. Therefore, it is essential that the interrogation signals do not reveal the interrogator location. This is different from the situation of an airplane, which is a large target distinct from its surroundings, transmitting in any case many electronic signals.

Jamming Immunity: It is important that an IFF system for ground forces be invulnerable to disturbances from external sources.

Operation in Any weather Conditions: It is essential for such a system to properly operate in fog, rain, smoke, dust, and under daylight and nighttime conditions.

IFF systems for ground forces exist. Prior art systems can be distinguished by the following categories:

a. Frequency Range for the Transmission/Reception:
   Optical: Such systems are generally laser or infrared operated, and require a line of sight, which does not always exist. Also, this operation is limited to good visibility conditions.
   Millimetric Waves: Systems operating in millimetric waves (generally in the range of 30 GHz–300 GHz) also require a line of sight. Furthermore, the resolution of such systems is limited, and they are relatively vulnerable to detection by enemy forces. If a narrow beam antenna is applied for obtaining good resolution, the scanning is required to cover the area, which lengthen the identification time, and might therefore be non-applicable for infantry.
   RF and Microwave Systems: Such systems generally operate in frequencies in the range of from several MHz up to a few GHz. These systems suffer from a relatively poor tracking, particularly as the infantry soldier cannot carry a large antenna. Furthermore, such systems are vulnerable to detection by enemy forces, and to masking.

Regarding the manner of operation, there are systems applying active interrogators and passive responders, systems applying active interrogators and active responders, and systems using an active beacon that transmits continuously, with a plurality of passive receivers.

There are some other systems that apply GPS for location. Each soldier (or vehicle) carries a GPS unit which determines his exact location. The location of each soldier is transmitted to a control center that receives the locations from all soldiers, and upon request, or when necessary, updates a specific soldier with the locations of all others. Such systems are also vulnerable to masking, as the frequencies of the GPS are public and known, are of narrow bands, and of relatively low amplitude. Also, the transfer of locations requires significant communications activity, which is undesirable in a battlefield.

U.S. Pat. Nos. 5,748,891 and 6,002,708 disclose systems for locating that apply UWB (Ultra Wide Band) transmission and reception of coded signals. The accurate range measuring is provided thanks to the very large bandwidth. The coded transmission and reception enables identification of the responding apparatus. The system is based on an accurate range measuring between several base stations. If the number of stations is 5 or more, and all the ranges between the station are known, then it is possible to find their relative locations. The interrogating station applies a procedure calling to at least 4 other stations, identifies them, measures the range to each of them, and receives from them the ranges between them. In this manner the station can provide the relative location of the stations, but not the direction to them. In order to determine the direction to the stations, the direction to at least two stations not being on a same line with respect to the interrogating station must be determined.

The drawback of said system is that a large amount of communication between stations is needed until the interrogator can determine the location of the responders with respect to himself. More particularly, not only the ranges from interrogator to the other stations is needed, but also the ranges between the other stations are required. All these ranges have to be transferred to the interrogator. In battlefield applications, these limitations are very significant.

It is therefore an object of the invention to provide an IFF system for ground applications, particularly for ground forces, most particularly for infantry forces in a battlefield, but also for vehicular forces.

It is another object of the invention to provide location of all friends in a battle zone, with a very high degree of certainty and very low probability of false identification.

It is another object of the invention to provide a ground IFF system which is invulnerable to detection, interrupting, and/or masking.

It is still another object of the invention to provide an IFF system, each apparatus of which can be carried by a single soldier.

It is still another object of the invention to provide an IFF system that is capable of operating essentially in all weather and visibility conditions.

It is still another object of the invention to provide an IFF system that does not require a line of sight in order to determine location and identification of other similar apparatuses.

Other objects and advantages of the invention will become apparent as the description proceeds.

SUMMARY OF THE INVENTION

The present invention relates to an IFF transponder for ground applications, which comprises: (a) Encoder for forming an interrogating or response sequence of pulses, and conveying the same to a UWB transmitter; (b) A UWB transmitter for getting said interrogating or response sequence of pulses, forming a corresponding interrogating or response signal of a sequence of UWB pulses, and transmitting the same via a UWB transmitting antenna; (c) A plurality of UWB receiving antennas, disposed away one from the other, for receiving either an interrogating signal or a response signal sent by another transponder; (d) Decoder for getting from at least one of said UWB receiving antennas received signals, decoding the same, comparing the decoded signal with a bank of pre-stored signals, and determining whether a received signal is an interrogating or response signal; and (e) A processing unit for, upon receipt of a signal of response to an interrogation signal sent by the present transponder, calculating the location of the responding transponder by: (i) Determining the range by the time delays between the interrogating and response signals; (ii) Determining the direction vector to the responding transponder by the time differences between arrival of each response pulse to a plurality of receiving antennas; and (iii) Determining the identity of the responding transponder by checking the received sequence of UWB pulses, assuming that the sequence of each transponder is unique.

Preferably, the determination of the range R to the responding transponder by performing:

$$\frac{[(T_r - T_s) - T_{proc}]c}{2} = R$$

wherein $T_r$ is the time of receipt of the first pulse of the response signal at the present transponder, $T_s$ is the time of transmitting the first pulse of the interrogation signal by the present transponder, $T_{proc}$ is the duration required for the interrogated transponder to process the interrogation signal, until transmitting the response signal;

and the determining of the direction vector to the responding transponder made by by performing:

$$\cos\theta = \frac{c\Delta T}{d}$$

wherein $\Delta T$ indicates the time difference of receipt of a same response pulse at a first receiving antenna and at a second receiving antenna, c is the speed of light, d is the distance between the said two receiving antennas, and $\theta$ is the angle between the said direction vector and a line connecting said two receiving antennas.

Preferably, the transponder comprises three receiving antennas that are disposed at tips of a triangle.

In an embodiment of the invention the transponder is used by an infantry soldier wherein the receiving antennas are disposed on the helmet of the soldier.

In an embodiment of the invention the receiving antennas are printed on the helmet.

In an embodiment of the invention the transmitting antenna is located at the center of the triangle.

In an embodiment of the invention, the UWB transmitter and the transmitting antenna are formed by two cones, a charging circuitry for charging the cones, and a fast switch for discharging the cones in order to produce a UWB pulse.

The transponder can also be installed and on a vehicle. In that case, an embodiment of the transponder comprises at least three receiving antennas and one transmitting antenna disposed at different locations on the vehicle. In still an embodiment of the invention, the receiving antennas on the vehicle are omni-directional antennas. Alternatively, the receiving antennas on the vehicle can be directional antennas. In still another embodiment, some the receiving antennas on the vehicle are omni-directional antennas and some of the antennas are directional antennas, all arranged to cover the area of interest.

Preferably, the transponder has two modes of operations, an interrogating mode in which the transponder interrogates the identity, range, and azimuth of another transponder in the area of interest, and a responding mode in which the apparatus respond to an interrogation issued by another transponder.

Preferably, each receiver of the transponder is adapted to receive pulses of responding signal that are above a predefined threshold level, a level which is above the noise level.

The present invention also relates to a method for determining by an interrogating transponder the azimuth to an interrogated transponder, that comprises the steps of: (a) Providing within the interrogating transponder a transmitting antenna, and at least two receiving antennas, disposed away one from the other; (b) Transmitting by the interrogating transponder a coded interrogation signal, comprising a plurality of UWB pulses; (c) Receiving at the interrogated transponder the interrogating signal, producing a response UWB signal, and transmitting the same to the interrogated transponder; and (d) Receiving by at least two receiving antennas within the interrogating transponder said response UWB signal, and calculating the direction to the interrogated transponder by the time differences between arrivals of each response pulse to a plurality of receiving antennas.

In an embodiment of the method of the invention, the direction determination is made by:

$$\cos\theta = \frac{c\Delta T}{d}$$

wherein $\Delta T$ indicates the time difference of receipt of one response pulse at a first receiving antenna and at a second receiving antenna, c is the speed of light, d is the distance between the said two receiving antennas, and $\theta$ is the angle between the said direction vector and a line connecting said two receiving antennas, assuming d<<R, wherein R is the distance between the interrogating transponder and the interrogated transponder.

DETAILED DESCRIPTION OF PREFERRED EMBODIMENTS

Figure 1:
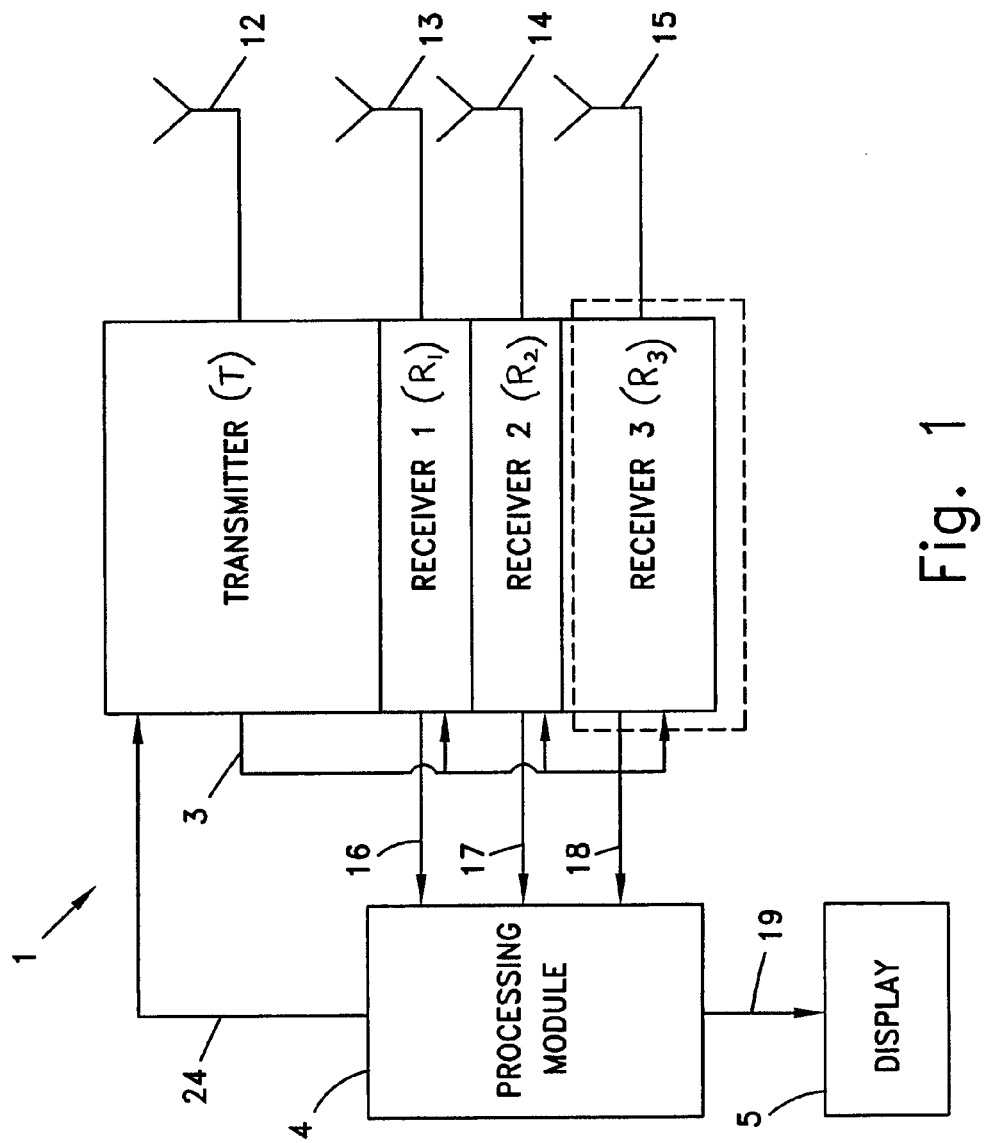
FIG. 1 illustrates in block diagram form a general structure of an IFF apparatus 1, according to one embodiment of the invention.

FIG. 1 illustrates in block diagram form a general structure of an IFF apparatus 1, according to one embodiment of the invention. According to the present invention, each IFF apparatus comprises a UWB transmitter T that transmits a coded interrogating signal (I-signal) from an omni-directional transmitting-antenna 12, and preferably three receivers R1, R2, and R3, receiving a coded response signal (R-signal) from friendly IFF apparatuses of soldiers or vehicles in an area of interest. Each receiver R1, R2, and R3 receives separately the response signal, via receiving-antennas 13, 14, and 15 respectively. The three receiving antennas 13, 14, and 15 are disposed at different locations on the object carrying the interrogating apparatus, in order to enable the receiver to measure the different arrival timing of the received signal to each of the said antennas with respect to the time of the transmitted signal. Preferably, receiving antennas 13, 14, 15 are not positioned on a same straight line.

In one embodiment of the invention, when the IFF apparatus is a personal apparatus for an infantry soldier, the transmitting antenna 12 and the three receiving antennas 13, 14, and 15, are preferably disposed at the outer surface of the helmet of the soldier. If the apparatus is assembled on a vehicle, the said four antennas are disposed at different locations of the vehicle. It should be noted that in order to obtain best location resolution, it is preferable to dispose the receiving antennas 13, 14, and 15 as far as possible one from another. Therefore, generally the said receiving antennas are disposed along the periphery of either the helmet or the vehicle. Each receiver also receives a sample 3 of the transmitting signal, allowing it to measure the time difference between the transmitted signal and the received signal at that receiver. The measured three time differences 16, 17, and 18 are conveyed to a processing module 4, that calculates from the time differences, and the known relative locations of the three receiving antennas one with respect to the others, and of the transmitting antenna, the azimuth to the relevant responding apparatus in the area of interest. Furthermore, the range to the responding apparatus is calculated by the processing module 4. The calculated location/s 19 are then provided to a display 5, and displayed.

When the transponder operates in an interrogated mode, an interrogating signal which comprises a plurality of UVB pulses is received by at least one of the receivers, for example $R_3$. The signal is then processed in the processing module, and when identified as an interrogating signal, a timing signal 24 is provided to the transmitter T to produce a coded response signal that comprises a plurality of UWB pulses. The response signal is also transmitted from antenna 12.

Figure 2:
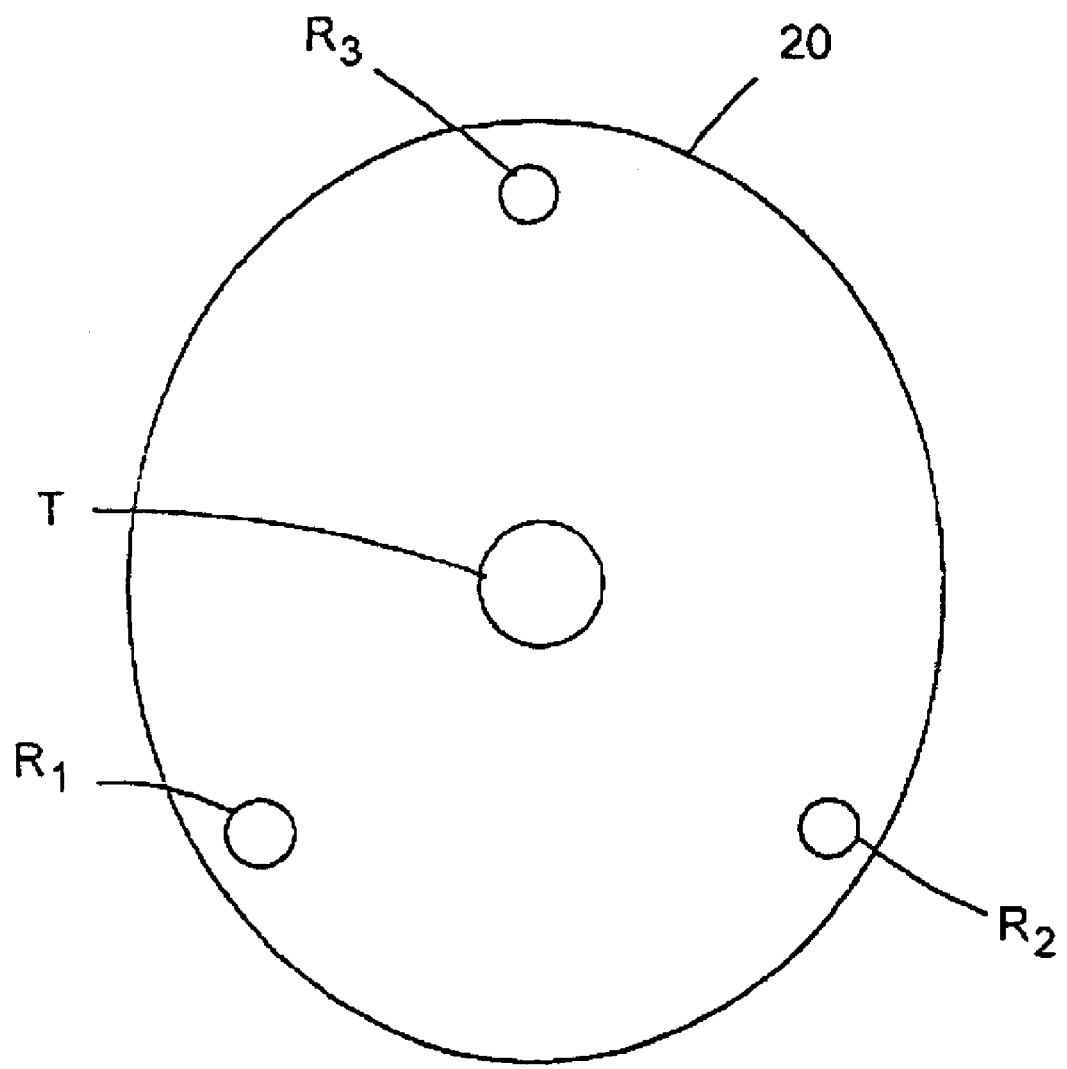
FIG. 2 shows an exemplary positioning of the four antennas T, R1, R2, and R3 on a soldier's helmet 20, according to an embodiment of the invention.

FIG. 2 shows an exemplary positioning of the four antennas T, R1, R2, and R3 on a soldier's helmet 20. The three receiving antennas R1, R2, and R3 are preferably positioned equilateral on the helmet. It is important not to position all the three receiving antennas on a same straight line. The transmitting antenna T is preferably positioned at a location away from each of the three receiving antennas, preferably at the center of the helmet.

In order to distinguish between separate responders that may be located in a same area, according to the present invention the transmitting signal, and the received signals are coded. For example, there may be defined at the transmitter T a separate code for each apparatus in the area. When a response is received, the interrogating apparatus compares the code of the received signal to a predefined list of codes, thereby determining from which responding apparatus in the area the signal is received. For the sake of simplicity, it will be assumed hereinafter that the I-signal is common, and is the same for all the apparatuses in the area. The R-signal is however unique for each IFF apparatus.

The operation of the IFF system of the present invention is based on the transmission and reception of series of very short UWB pulses. By its basic nature, a UWB pulse carries very little information at the frequency domain. Its useful information, however, is the timing of the pulse. Therefore, according to the present invention the I-signals and the R-signals are corresponding series of pulses that are coded by their timing. For example, if the I-signal comprises three UWB pulses, that are transmitted at $t_1$, $t_2$, and $t_3$ respectively, the differences between these three times may form a code. For example, the above three-pulse I-signal comprises two time differences: $\Delta T_1 = T_1 - T_2$; and $\Delta T_2 = T_3 - T_2$. If, for example, $\Delta T_1$; $\Delta T_2 \leq T_{max}$ and each pulse duration is $\tau$, the number of possible codes in this case is $$\left(\frac{T_{max}}{\tau}\right)^2.$$

For n pulses in a coded signal, the number of possible codes is $$\left(\frac{T_{max}}{\tau}\right)^{n-1}.$$

The operation of the system begins by one of the apparatuses sending an interrogation signal (I-signal), that as said comprises a coded series of UWB pulses. This series is received by at least one receiver (R1, R2, or R3) of an interrogated apparatus, which upon decoding the signal an identifying that it is an interrogation signal, responds by transmitting from its transmitter T a coded R-signal which is preferably unique to that apparatus. Then, the interrogating apparatus performs a process for determining the identity of the interrogated apparatus, the range to that apparatus, and the azimuth to the apparatus.

The identity of the interrogated apparatus is determined by decoding and checking at the interrogating apparatus the coded received signal. More particularly, the existence of the pulses within R-signal, as received is checked, and the timing of each pulse within the signal.

The range R to the object is determined by performing the following calculation:

$$\frac{[(T_r - T_s) - T_{proc}]c}{2} = R,$$

wherein $T_r$ is the time of receipt of the first pulse of the R-signal at the interrogating apparatus, $T_s$ is the time of transmitting (sending) the first pulse of the I-signal by the interrogating apparatus, $T_{proc}$ is the duration required for the interrogated apparatus to process the I signal, until transmitting the R-signal. More particularly, this is the duration from the receipt of the first pulse of the I-signal by the interrogated apparatus, until the transmission of the first pulse of the R-signal by the interrogated apparatus. This duration is generally assumed to be constant, and is stored within the interrogating apparatus for that range calculation. The term c indicates the speed of light.

Figure 3:
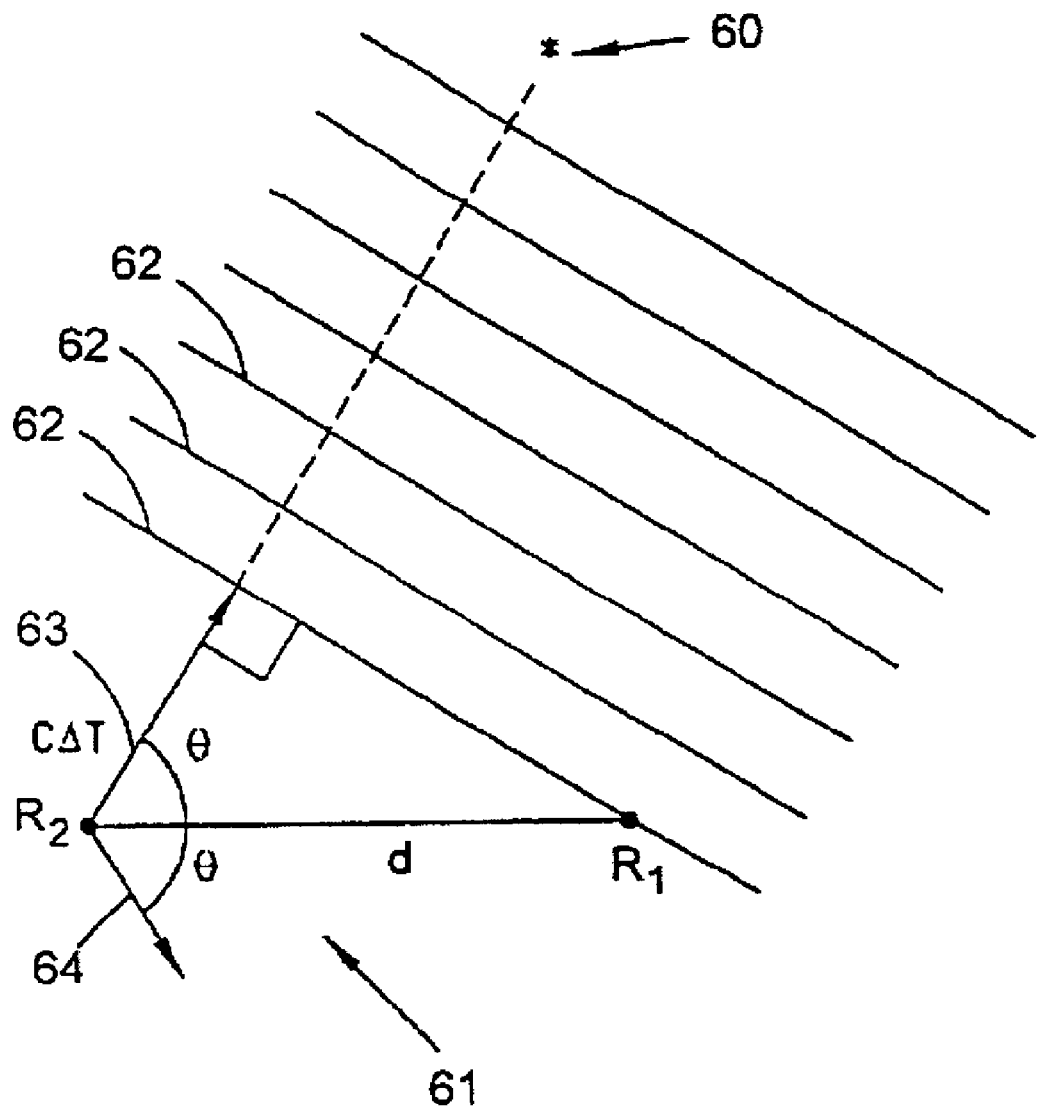
FIG. 3 illustrates how the azimuth to an interrogated apparatus is determined by the interrogating apparatus, having, in this case two receiving antennas.

FIG. 3 illustrates how the azimuth to an interrogated apparatus 60 is determined by the interrogating apparatus 61, having, in this case two receiving antennas R1 and R2. The distance between the two receiving antennas is indicated by d. As the distance R between the interrogated apparatus 60 and the interrogating apparatus 61 is much greater than the distance d, i.e., R<<d, it can be assumed the front of the electromagnetic wave due to the response transmitted by apparatus 60 is essentially planar when reaching the interrogating apparatus 61. Therefore, the front of the wave is indicated in FIG. 3 by straight lines 62. The object of the interrogating apparatus is to determine a direction vector 63 directing to the interrogated apparatus 60, or more particularly, a vector 63 forming a 90° angle with the front 60 of the response wave. The interrogating apparatus determines the time of arrival of the first pulse of the response to its first antenna R1 and to its second antenna R2. Generally, the front of the response wave does not arrive at a same time into antennas R1 and R2. In the example of FIG. 3, the front of the wave arrives R1 slightly before it arrives R2. The arrival time difference $\Delta T = T_1 - T_2$ is determined, wherein, $T_1$ indicates the time of arrival of the front to R1, and $T_2$ is the time of arrival to antenna R2, and is used to determine the direction vector 63. Therefore, c$\Delta T$ indicates the distance that the wave travels during $\Delta T$. Therefore, the angle $\theta$ can be determined by:

$$\cos\theta = \frac{c\Delta T}{d}.$$

Figure 4:
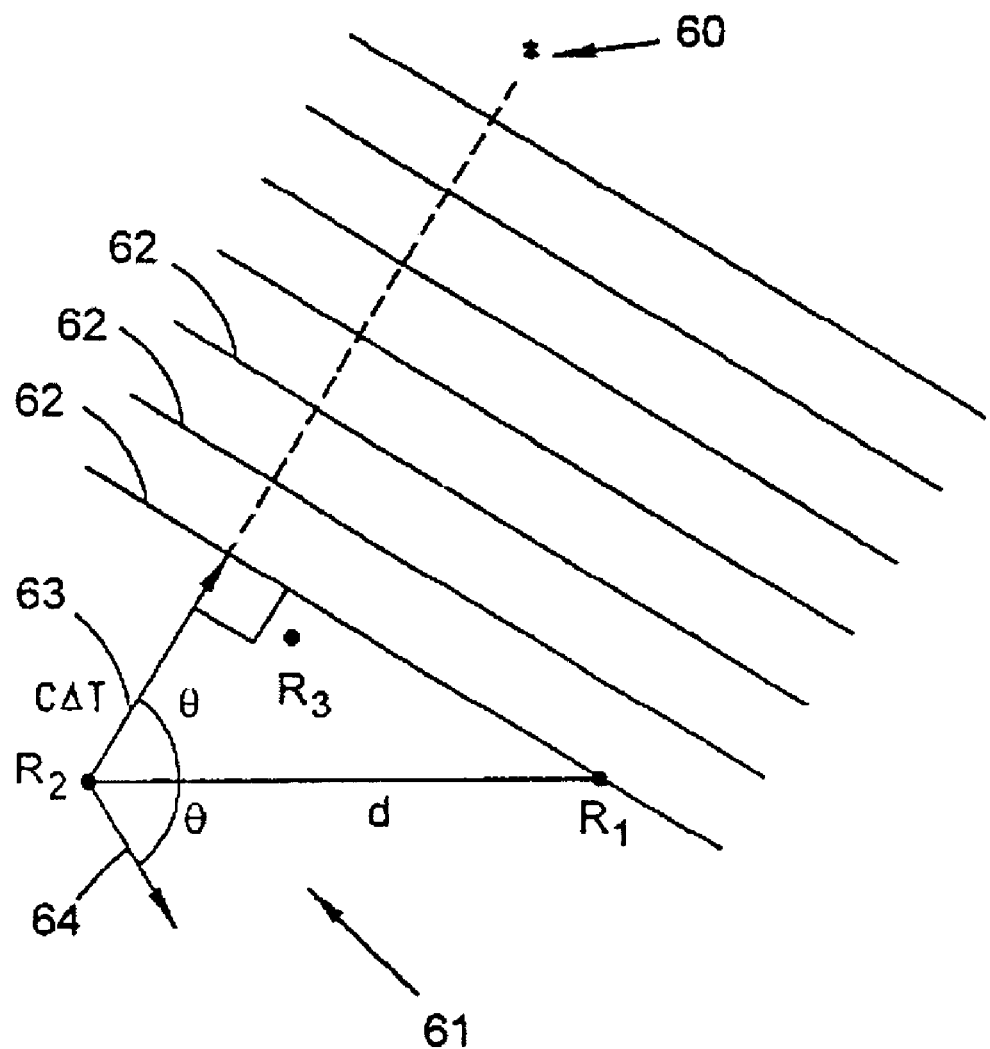
FIG. 4 illustrates how the uncertainty in the location of the object is resolve by adding a third receiving antenna, forming a triangle with the other two receiving antennas.

In FIG. 3 it is shown how to find the direction to the interrogated apparatus. However, when only two antennas R1 and R2 are used, the may be uncertainty regarding the direction to the interrogated apparatus. Upon calculating the angle $\theta$, the direction to the interrogated apparatus may be erroneously assumed to be as indicated by the direction vector 64, also forming an angle $\theta$ with respect to the line connecting R1 and R2. This uncertainty is resolve by adding a third receiving antenna, R3, forming a triangle with R1 and R2, as shown in FIG. 4. In the example as discussed in FIG. 3, it is clear that a wave front coming from the direction 63 will pass R3 before it passes R1. However, a wave front coming from a direction 64 will pass the antenna R3 only after it passes R1. Therefore, a consideration of the time of arrival to the third antenna R3, with respect to the time arrival to the other antennas R1 and R2, provides means for resolving this direction uncertainty. Therefore, although in some cases two receiving antennas may suffice in order to determine with enough certainty the direction (for example, a prior knowledge regarding the possible location of the one who carries the interrogated apparatus may help), in a preferable embodiment of the invention three antennas are used.

In still another embodiment, when a determination of a spatial direction to an apparatus is necessary, use of a fourth antenna, located in a plane different than the plane of the other three antennas is required, and the determination of the direction is carried out essentially in a same manner. The operation of the system starts when one of the apparatuses sends an interrogating coded series of UWB pulses. The series is received at at least one receiver of each of the friend apparatuses in the area surrounding the interrogator, up to a maximum range depending on the design of the specific apparatus and the ground conditions.

Each friend apparatus identifies a code of the interrogating friend, and responds with a transmission of a coded series of UWB pulses delayed by a delay known to all friends.

The interrogating apparatuses receive all the responses from all friends and identify them according to their specific codes. The interrogating apparatus can now calculate the range and azimuth to each friend apparatus. The range is calculated from the total time delay between transmitting the I-code and receiving the R-code from the responder. The azimuth is calculated from the time differences of the arrival of each pulse to the three receiving antennas.

Figure 5A:
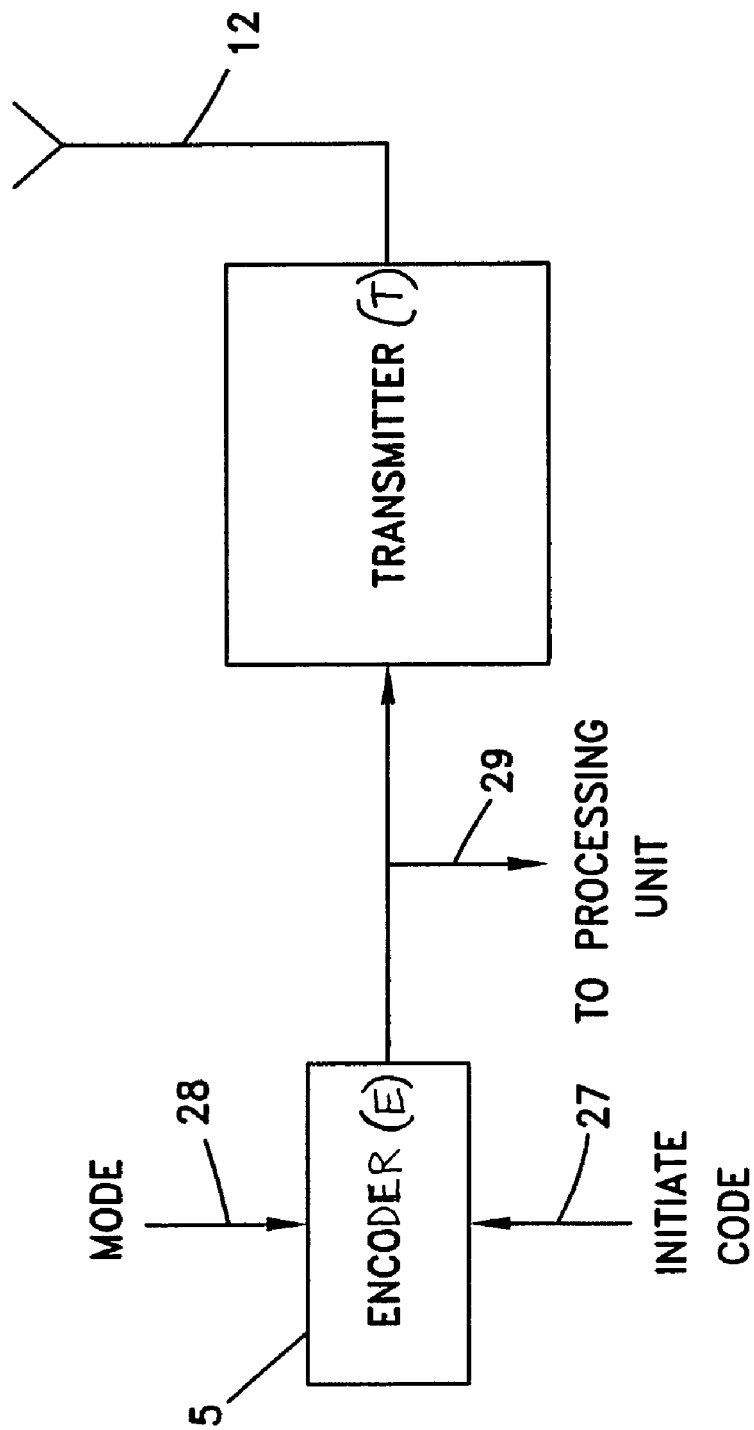
FIG. 5A illustrates the structure of the transmitting portion of the IFF apparatus, according to one embodiment of the invention.

FIG. 5A illustrates the structure of the transmitting portion of the IFF apparatus 1, according to one embodiment of the invention. As said, the IFF apparatus may have two modes of operations, a first mode operating as an interrogating apparatus, and a second mode operating as an interrogated apparatus. Therefore, the Encoder E is designed to initiate at least two distinct codes, an interrogating code, or a responding code respectively, according to the mode of operation as provided by the MODE line 28 coming from the processing module. The processing module also provides to the encoder the timing 27 for the corresponding code creation. In the case of an interrogating mode, the actual timing of the code creation is provided to the processing module 4 by line 29 for the range and direction determination. The code is then provided to the UWB pulse transmitter T.

The transmission by the system applies a UWB technology. UWB technology deals with the transmission and reception of wide-band signals. A conventional definition of a UWB transmission is a case in which the relation between the band spectrum divided by the central frequency of the spectrum is above 25%. A pulse having four cycles corresponds to a bandwidth of 25%. While such a pulse can be used, a mono-cycle pulse is preferable in the present invention, since it is the shortest, giving better timing and less spectral signature (covertness).

Figure 5B:
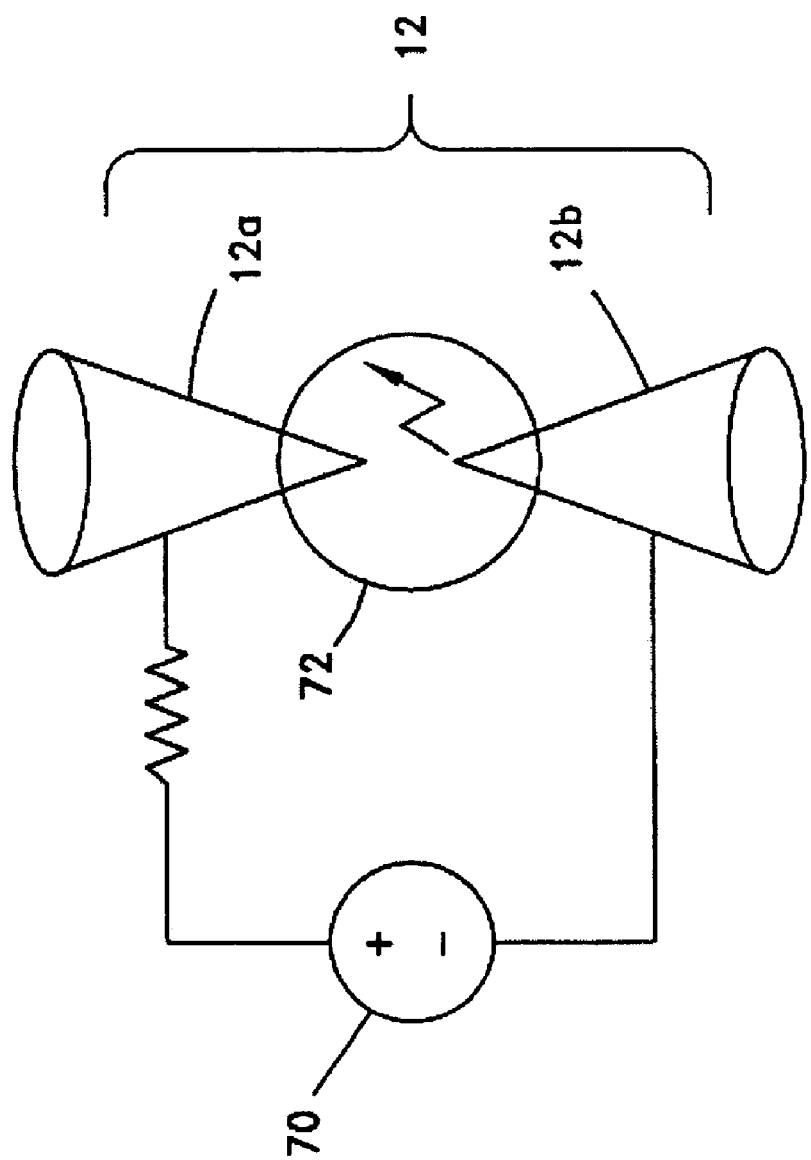
FIG. 5B illustrates a possible structure of the UWB transmitter and transmitting antenna, according to one embodiment of the invention.

A possible structure of the UWB transmitter T and transmitting antenna 12, according to one embodiment of the invention, is shown in FIG. 5B. The transmitter and antenna comprise of a charging module 70, fast switch 72, and a wide band "bi-cone" antenna 12 made of two cones 12*a* and 12*b*. The tips of said two cones are positioned in close proximity. In order to create a UWB pulse, the charging circuitry 70 charges the two cones 12*a* and 12*b* with opposite polarity charge. Then, the switch is closed to allow a flow of current between the two charged cones. This current radiates omni-directionally a UWB pulse. This type of antenna is known in the art as bi-conical antenna. Obviously, there are known in the art other ways and means that are capable of producing UWB pulses.

Figure 6:
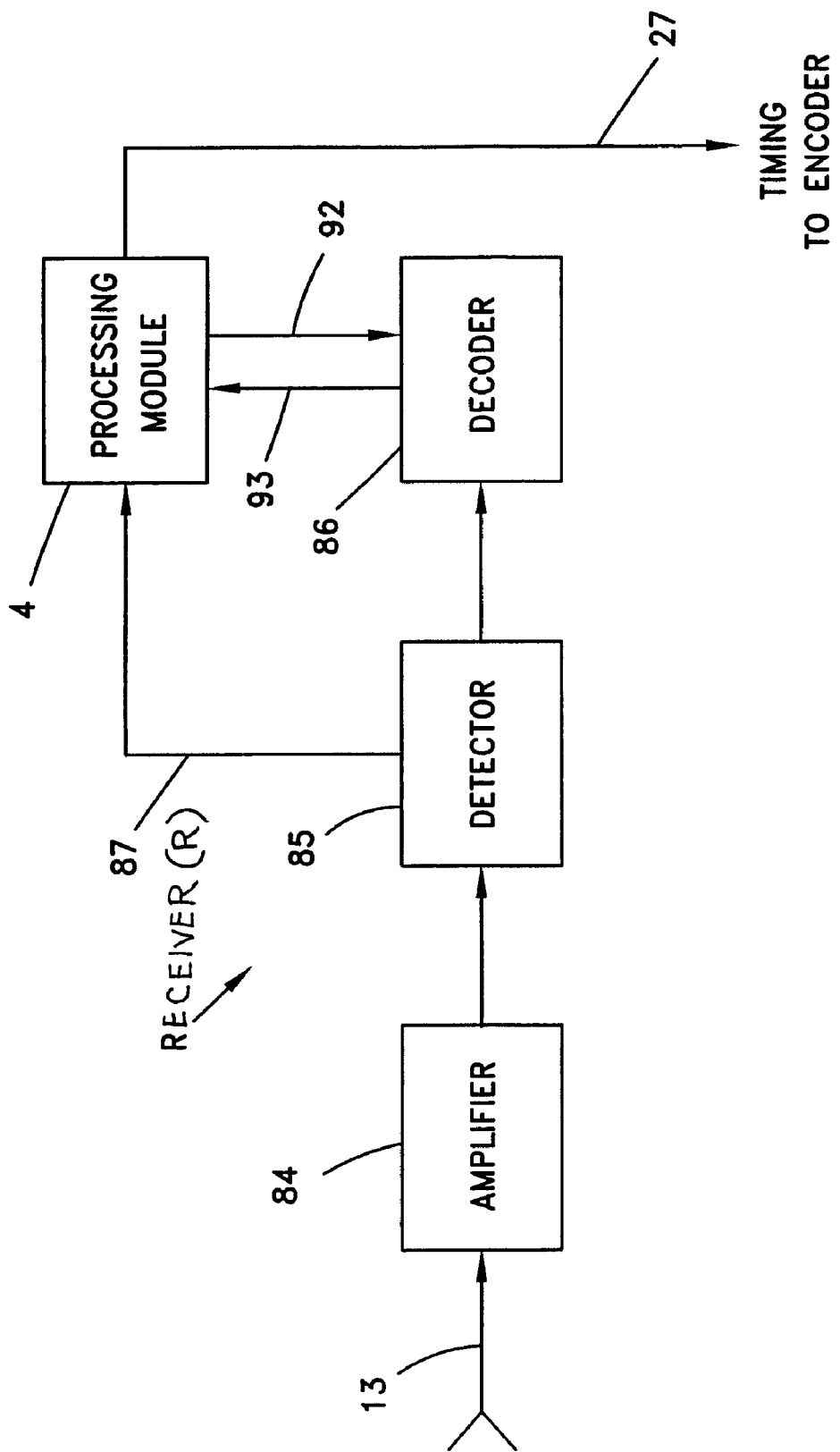
FIG. 6 illustrates the operation of one of the receivers included in the IFF apparatus.

FIG. 6 illustrates the operation of one of the receivers included in the IFF apparatus. Numeral 13 indicates the UWB antenna of the receiver. Amplifier 84 is a very broad-band amplifier, which amplifies the received signal. The amplified signal is then conveyed into a threshold detector 85 that transfers only pulses above a predefined threshold level to decoder 86. Furthermore, when a pulse above the threshold level is detected, a signal 87 indicating the timing of the pulse is transferred into the processing module 4.

As said, the IFF apparatus can operate in two modes. The processing apparatus indicates to the decoder by signal 92 the mode of operation, i.e., interrogating or interrogated. Whenever the apparatus operates in the interrogated mode, the decoder looks for a received sequence of pulses as assigned for the interrogating code. The decoder particularly checks the time of appearance of each pulse within the sequence, and tries to find matching to an interrogating signal. Whenever such a matching is found, the decoder conveys a signal 93 to the processing module 4, which in turn initiates a transmission of a response signal by providing to the encoder E of the transmitting portion a timing signal 27.

Whenever the apparatus operates in an interrogating mode, the timing of each received pulse is conveyed via line 87 into the processing module 4. The decoder compares each received sequence with a bank of stored codes. When the decoder detects that the received signal relates to a response sequence, generally the timing of the first pulse of the response sequence is used for determining the range and the azimuth to the interrogated apparatus, as described above. As said, the processing module can calculate the range to the interrogated apparatus by means of having the timing of the first pulse (or another, as defined) of a response sequence as received at one of the receivers. However, in order to calculate the direction to the interrogated apparatus, the processing module uses the timing of receipt of said pulse at at least two, and preferably three of such receivers.

The use of a wide-band pulse in the system of the invention allows a very good resolution. For example, in a pulse having duration T, the range resolution in an air medium is about cT. For example, use of a pulse of 1 nsec enables a range resolution of 0.3 m. If the rising period of the pulse is short, for example, in a 1 nsec pulse of one cycle, the rising duration from zero to maximum is 0.25 nsec, which is comparable to a range resolution of about 7.5 cm.

EXAMPLE 1

System for an Infantry IFF a one period pulse is transmitted, The uncertainty in determining the azimuth depends on the rising time of the pulse. For example, if a pulse with a rising time of $R_p$=0.25 nsec is used, during this time a response pulse passes a range of D=c·$R_p$=7.5 cm. If the distance between the two receiving antennas is 30 cm, the angle resolution is about arcsin $$\frac{7.5}{30} = 15°.$$

As said, the third antenna is used in order to obtain unequivocal direction to the interrogated object, as when two antennas are used, a 180° symmetry exists, which does not allow determination of the position. For this reason, the three receiving antennas are not located on a same straight line.

Figure 7A:
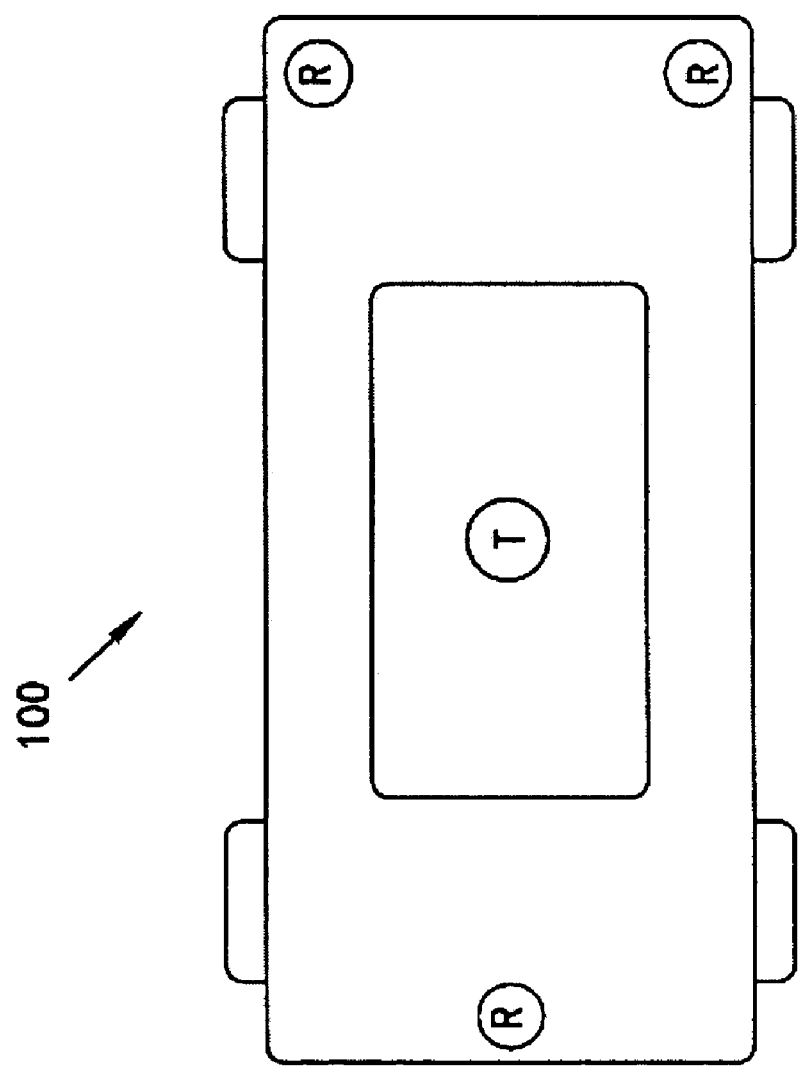
FIG. 7A provides a top view of a battlefield vehicle, in which the positioning of the three receiving antennas and one transmitting antenna according to an embodiment of the invention is indicated.
Figure 7B:
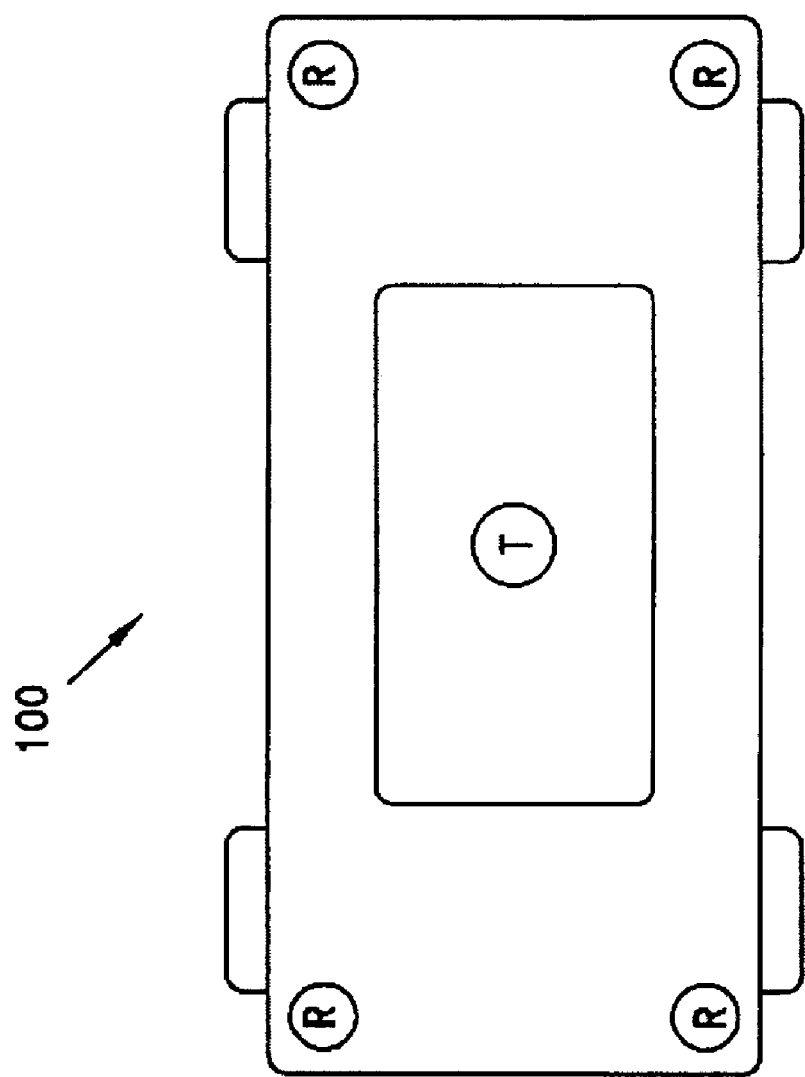
FIG. 7B shows an arrangement for a battlefield vehicle, with 4 directional receiving antennas, and one omni-directional transmitting antenna.
Figure 7C:
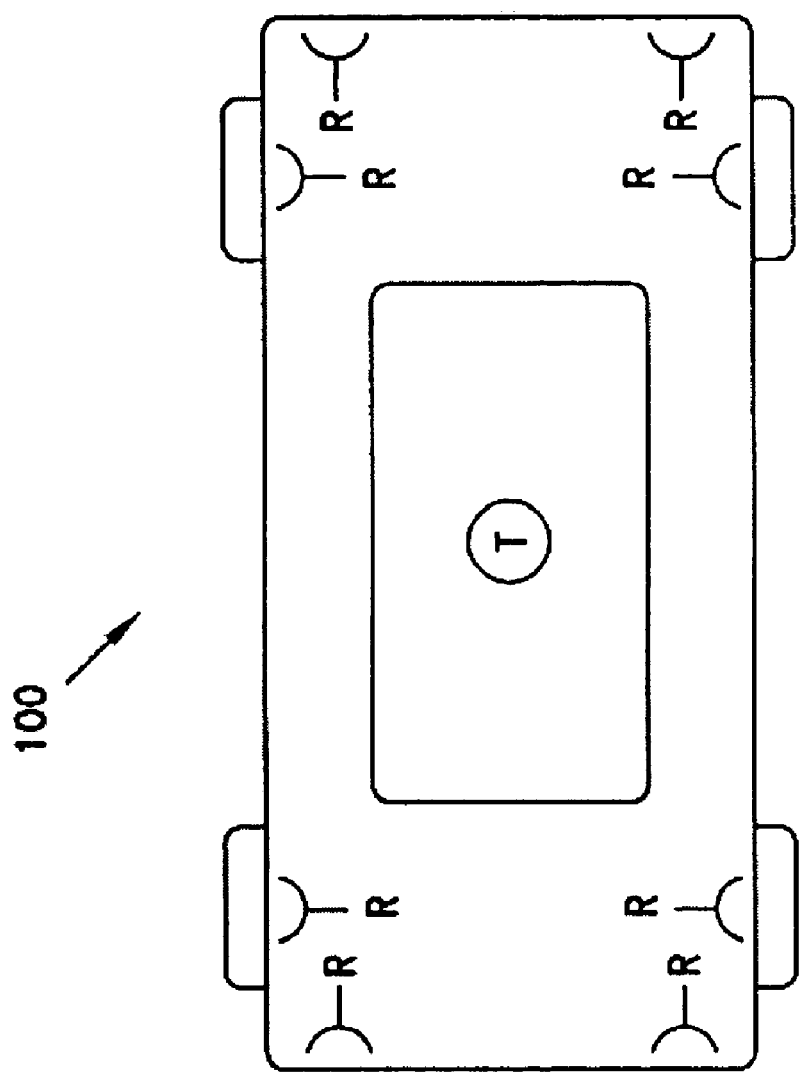
FIG. 7C shows an arrangement for a battlefield vehicle, with 8 directional receiving antennas, and one omni-directional transmitting antenna.

FIG. 7A provides a top view of a battlefield vehicle 100, in which the positioning of the three receiving antennas R and one transmitting antenna T is indicated. In the case of vehicles, there exist requirements for a capability for a longer range, up to several kilometers, and for a better angular resolution in comparison with the infantry system. Therefore, in some cases more than 3 receiving antennas may be used. More particularly, 4 directional receiving antennas, as shown in FIG. 7B, or even 8 directional receiving antennas as shown in FIG. 7C may be used. In some cases, use of directional antennas may be applied, such that, for example, each two directional antennas cover 180° of the area. In that case, the exact location can be obtained by using only two directional receiving antennas each time. The omni-directional transmitting antenna in all cases is preferably raised, and positioned at the center of the vehicle.

EXAMPLE 2

System for Battlefield Vehicles

As said, the angular resolution is a function of the distance between the receiving antennas. In a battlefield vehicle, the distance between two receiving antennas can reach 3 meters. For a 1 nsec monocycle pulse, the angular resolution is arcsin $$\frac{7.5}{300} = 1.5°,$$

or more particularly, at a 1 km distance, the uncertainty in the location of the vehicle is about 26 meters, which is reasonable. If a better resolution is desired, a shorter pulse should be used.

In the case of battlefield vehicles, the number of interrogations can be reduced. For example, one vehicle may perform a single interrogation, the responses will be received by all the vehicles in the area, and from these each vehicle will be able to determine the direction to each other responding vehicles. The range cannot be determined. This mode of operation is preferable, as it involves a minimum number of interrogations.

In still another mode of operation, an additional step is added, in which after the first interrogation by a first vehicle, all the other vehicles respond in a specific code, after that, the first vehicle again responds to each of the vehicles in another specific code. In this case, each vehicle is able to find the location of the first vehicle with respect to itself, and also the location of all the other vehicles.

The above manners of operation can also be applied by infantry forces. The reduction of the number of transmissions is important for obtaining covertness, especially in the battlefield.

The invention provides a system by which each apparatus can identify and locate independently other similar apparatuses. The apparatuses of the invention require for fulfilling said objectives only the transmission of the response code and does not require any additional location data from any other apparatus, as is required, for example by the systems of U.S. Pat. Nos. 5,748,891, and 6,002,708 (Aether Wire & Location Inc.). The systems of said two patents, which are spread spectrum based, require data from a GPS, or have to perform a very complicated timing procedure, as described in page 9, of U.S. Pat. No. 5,748,891 ("ranging protocol"). The issue of timing in spread spectrum system is known to be essential. In spread spectrum systems the communication assumes the receipt of information below the noise level, while a procedure involving integration and correlation of the received signal enables recovery of the data. In a noisy environment, such as a battlefield, a low power communication is vulnerable to disturbances. The system of the invention assumes reception above the noise level, which, although requires higher power transmission, is less vulnerable.

The system of the invention is further more immune to interferences, due to the use of a relatively high power transmission (relative to spread spectrum transmission) and very wide spectrum. One who wishes to interfere with the system has not only to transmit in a higher power (relative to case of spread spectrum transmission), but also provide said transmission in a very wide spectrum. As the timing of the transmission by the apparatuses of the invention is not known to the interrupting entity, it has to transmit a high power, all the time, and in a very wide spectrum, which is generally impossible.

A good level of covertness of the system of the invention is obtained also by means of the use of very short pulses, in the range of about 1 nsec, which include very few cycles, preferably one. It is very hard to track such type of pulse transmission. Also, similar short pulses are generally produced by atmospheric activities, operation of man-made objects, or other human activities. However, only the means which have the timing code can differentiate between environmental noise and interrogating signals.

It should be further noted that the present invention is differentiated from the prior art systems, as disclosed in U.S. Pat. Nos. 5,748,891, and 6,002,708, also by the way of determining the location of the interrogated object. While the said systems of the prior art require communication with at least 4 other stations in order to determine the location, according to the present invention the location is determined by means of one transmitting antenna and three receiving antennas, with no need for communications between the different interrogating units.

The system of the invention is also highly immune to reflections. The ground environment generally contains many reflecting objects. The system of the invention applies short pulses and it considers only the pulse that arrives first at its receiver (which obviously traveled the shortest route), the other signals due to reflections, which travel a longer route, are ignored. Systems which are based on spread spectrum have to check more pulses, and therefore are more sensitive to reflections.

The invention claimed is:

1. An IFF apparatus for ground applications, comprising:
an encoder for forming an interrogating or response sequence of pulses, and conveying the same to a UWB transmitter;
an UWB transmitter for getting said interrogating or response sequence of pulses, forming a corresponding interrogating or response signal of a sequence of UWB pulses, and transmitting the same via a UWB transmitting antenna;
a plurality of UWB receiving antennas, disposed away one from the other, for receiving either an interrogating signal or a response signal sent by another IFF apparatus;
a decoder for getting from at least one of said UWB receiving antennas received signals, decoding the same, comparing the decoded signal with a bank of pre-stored signals, and determining whether a received signal is an interrogating or response signal; and
a processing unit for, upon receipt of a response signal to an interrogating signal sent by the present IFF apparatus, calculating the location of the responding IFF apparatus by:

a. determining the range R by the time delays between the interrogating and response signals;
b. determining the direction vector to the responding IFF apparatus by evaluating the time differences between arrival of each response pulse to a plurality of receiving antennas; and
c. determining the identity of the responding IFF apparatus by checking the received sequence of UWB pulses, assuming that the sequence of each IFF apparatus is unique.

2. An IFF apparatus according to claim 1, wherein the range R to the responding IFF apparatus is determined by performing:

$$\frac{[(T_r - T_s) - T_{proc}]c}{2} = R$$

wherein $T_r$ is the time of receipt of the first pulse of the response signal at the present IFF apparatus, $T_s$ is the time of transmitting the first pulse of the interrogating signal by the present IFF apparatus, $T_{proc}$ is the duration required for the interrogated IFF apparatus to process the interrogating signal, until transmitting the response signal;
and the the direction vector to the responding IFF apparatus is determined by performing:

$$\cos\theta = \frac{c\Delta T}{d}$$

wherein $\Delta T$ indicates the time difference of receipt of a same response pulse at a first receiving antenna and at a second receiving antenna, c is the speed of light, d is the distance between the said two receiving antennas, and $\theta$ is the angle between the said direction vector and a line connecting said two receiving antennas.

3. An IFF apparatus according to claim 1 comprising three receiving antennas that are disposed at tips of a triangle.

4. An IFF apparatus according to claim 3 for use by an infantry soldier wherein the receiving antennas are disposed on the helmet of the soldier.

5. An IFF apparatus according to claim 4 wherein the receiving antennas are printed on the helmet.

6. An IFF apparatus according to claim 3 wherein the transmitting antenna is located at the center of the triangle.

7. An IFF apparatus according to claim 1 wherein the UWB transmitter and the transmitting antenna are formed by two cones, a charging circuitry for charging the cones, and a fast switch for discharging the cones in order to produce a UWB pulse.

8. An IFF apparatus according to claim 1, for use on a vehicle.

9. An IFF apparatus according to claim 8 comprising at least three receiving antennas and one transmitting antenna disposed at different locations on the vehicle.

10. An IFF apparatus according to claim 9 wherein the receiving antennas on the vehicle are omni-directional antennas.

11. An IFF apparatus according to claim 9 wherein the receiving antennas on the vehicle are directional antennas.

12. An IFF apparatus according to claim 9 wherein some of the receiving antennas on the vehicle are omni-directional antennas and some of the antennas are directional antennas, all arranged to cover the area of interest.

13. An IFF apparatus according to claim 1 having two modes of operations, an interrogating mode in which the IFF apparatus interrogates the identity, range, and azimuth of another IFF apparatus in the area of interest, and a responding mode in which the IFF apparatus responds to an interrogation issued by another IFF apparatus.

14. An IFF apparatus according to claim 1 wherein each receiver is adapted to receive pulses of responding signal that are above a predefined threshold level, the predefined threshold level being a level which is above the noise level.

15. An IFF apparatus according to claim 1, wherein the IFF apparatus has two modes of operations, a first mode operating as an interrogating apparatus, and a second mode operating as an interrogated apparatus.

16. An IFF apparatus according to claim 15, wherein the IFF apparatus operates as a transponder in the second mode.

17. A method for determining by an interrogating IFF apparatus the azimuth to an interrogated IFF apparatus, comprising the steps of:
a. providing within the interrogating IFF apparatus a transmitting antenna, and at least two receiving antennas, disposed away one from the other;
b. transmitting by the interrogating IFF apparatus a coded interrogation signal, comprising a plurality of UWB pulses;
c. receiving at the interrogated IFF apparatus the interrogation signal, producing a response UWB signal, and transmitting the same to the interrogated IFF apparatus;
d. receiving by at least two receiving antennas within the interrogating IFF apparatus said response UWB signal, and calculating the direction to the interrogated IFF apparatus by evaluating the time differences between arrivals of each response pulse to a plurality of receiving antennas.

18. A method according to claim 17, wherein the direction determination is made by:

$$\cos\theta = \frac{c\Delta T}{d}$$

wherein $\Delta T$ indicates the time difference of receipt of one response pulse at a first receiving antenna and at a second receiving antenna, c is the speed of light, d is the distance between the two receiving antennas, and $\theta$ is the angle between the direction vector and a line connecting said two receiving antennas, assuming d<<R, wherein R is the distance between the interrogating IFF apparatus and the interrogated IFF apparatus.

* * * * *